United States Patent
Berl

(10) Patent No.: US 11,551,281 B2
(45) Date of Patent: Jan. 10, 2023

(54) RECOMMENDATION ENGINE BASED ON OPTIMIZED COMBINATION OF RECOMMENDATION ALGORITHMS

(71) Applicant: Optimizely, Inc., San Francisco, CA (US)

(72) Inventor: Ethan Berl, San Francisco, CA (US)

(73) Assignee: OPTIMIZELY, INC., Palo Alto, CA (US)

( * ) Notice: Subject to any disclaimer, the term of this patent is extended or adjusted under 35 U.S.C. 154(b) by 47 days.

(21) Appl. No.: 16/775,067

(22) Filed: Jan. 28, 2020

(65) Prior Publication Data

US 2021/0233147 A1 Jul. 29, 2021

(51) Int. Cl.
*G06Q 30/06* (2012.01)
*G06N 20/00* (2019.01)

(52) U.S. Cl.
CPC ......... *G06Q 30/0631* (2013.01); *G06N 20/00* (2019.01)

(58) Field of Classification Search
CPC ................................. G06Q 30/06–08
See application file for complete search history.

(56) References Cited

U.S. PATENT DOCUMENTS

| | | | |
|---|---|---|---|
| 2009/0006398 A1* | 1/2009 | Lam ....................... | G06Q 30/02 |
| 2010/0042608 A1* | 2/2010 | Kane, Jr. ............. | G06F 16/9535 |
| | | | 707/732 |

OTHER PUBLICATIONS

Harvard Business Review, A Refresher on A/B Testing, Amy Gallo, Jun. 28, 2017 (Year: 2017).*
Google says machine learning is the future. So I tried it myself, Alex Hern Jun. 28, 2016; (Year: 2016).*
Recommended For You: How machine learning helps you choose what to consume next, Jennifer Wei, Aug. 28, 2017; (Year: 2017).*
Machine Learning: What it is and why it matters, SAS, Jan. 7, 2014. (Year: 2014).*

* cited by examiner

*Primary Examiner* — Ming Shui
(74) *Attorney, Agent, or Firm* — Womble Bond Dickinson (US) LLP

(57) ABSTRACT

A method includes receiving a training metric, the training metric indicating a parameter to be optimized by content recommendations. A machine learning algorithm maybe used to determine a plurality of different combinations of the recommendation algorithms in the experiment, and each of one or more of the plurality of combinations may be used to generate a content recommendation for one or more visitors. The statistical performance of each of the one or more combinations in optimizing the parameter (based on the content recommendations generated by those combinations) may be monitored and a higher percentage of visitors may be allocated to a combination that generates content recommendations that are the most effective at optimizing the parameter.

20 Claims, 9 Drawing Sheets

RECOMMENDATION ENGINE BASED ON OPTIMIZED COMBINATION OF RECOMMENDATION ALGORITHMS

FIELD OF TECHNOLOGY

The embodiments described herein pertain in general to generating content recommendations for a user, and more particularly to generating content recommendations that will optimize particular performance metrics.

BACKGROUND

Content providers may run content experiments to answer specific questions about their content such as which variation of a web page or digital product (including various features of, or other content items in such pages or products) are more successful. Such experiments may be based on visitor behavior, and thus may track actions that a visitor takes, such as clicks, page views, form submissions, and purchases, for example. One example of such an experiment is a recommendation engine. Recommendation engines are useful for showing visitors content or products they may be interested in, based on their browsing behaviors and/or other factors. For example, a recommendation engine may monitor certain behaviors of a visitor on a retail website (e.g., page views, purchases) and based on the information gathered, may display recommended products on a home page of the website and/or display alternative items that are related to the product a visitor is currently browsing.

Figure 1:
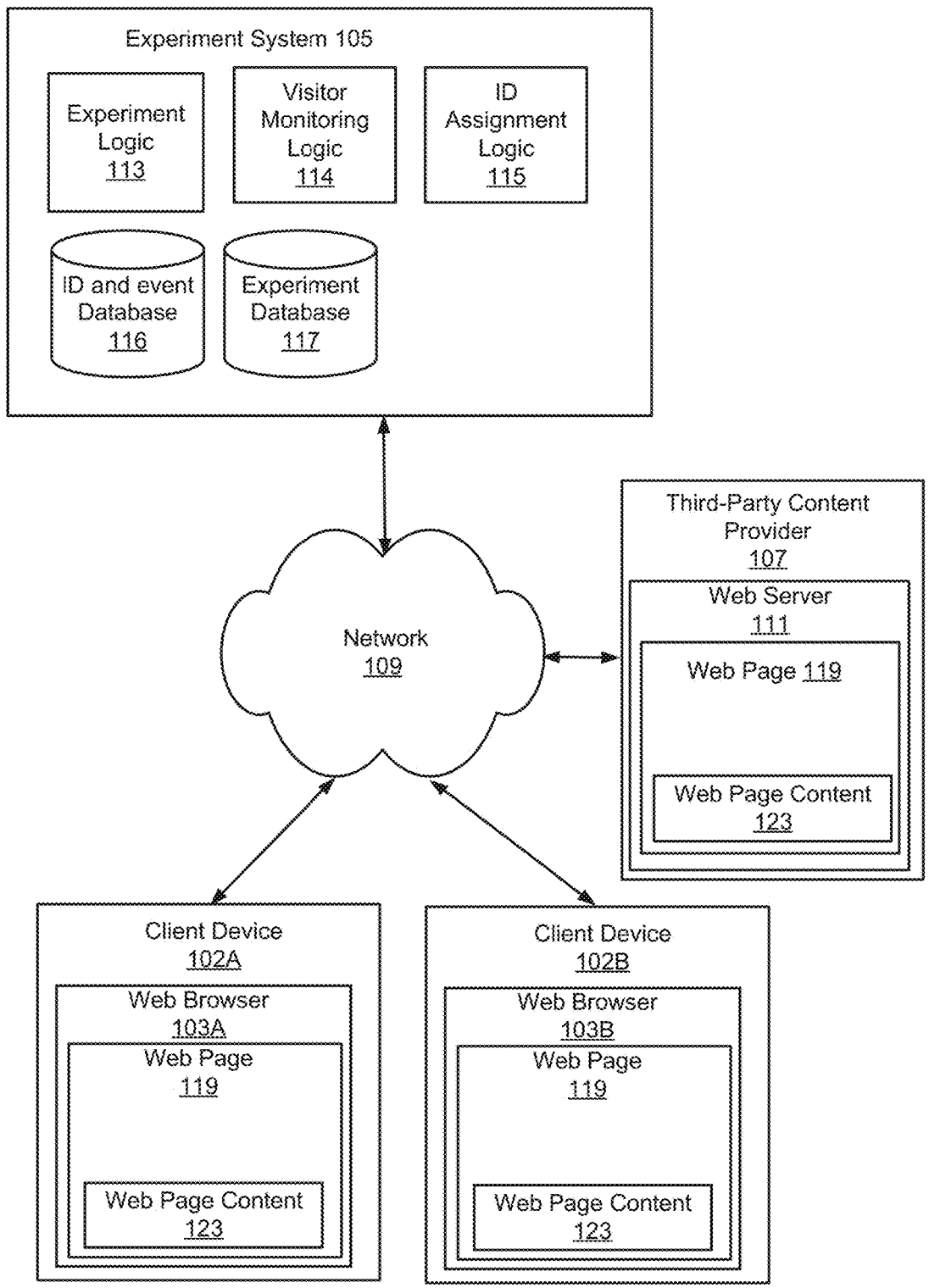
FIG. 1 is a block diagram of a content experiment system environment, in accordance with some embodiments of the present disclosure.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Recommendation engines function to provide content recommendations to visitors of a content provider, such as a retail website. For example, on a checkout page, the recommendation engine may show the visitor accessories that complement the items a visitor is purchasing. In another example, a recommendation engine may show alternative items that are related to the product a visitor is currently viewing on a product page. A recommendation engine can also highlight content that is considered a "crowd favorite" on the homepage. A recommendation engine may function using one or more recommendation algorithms. A content provider may have a number of algorithms at their disposal with which to implement a recommendation engine. A recommendation algorithm may generate content recommendations based on information such as popular content, browsing behavior of the visitor, historical browsing behavior of previous visitors, or text associated with the content a visitor is currently browsing, for example. Each recommendation algorithm may utilize a particular type(s) of information to generate recommendations, and thus may represent a particular "strategy" for generating recommendations.

Although each algorithm may include numerous variants, there are a limited number of algorithms, and thus a limited number of "strategies" for generating content recommendations. Although the outputs of one or more algorithms can be combined, in most content recommendation systems this still only provides a limited number of approaches to generating content recommendations and may not be capable of determining a precise combination that will generate recommendations that are ideal for optimizing a training metric. Traditionally, in order to use two different types of information (e.g. an individual user's behavior and aggregate audience behavior), one would need to create a new algorithm which takes both types of information as input. However, execution of such an algorithm becomes time consuming once the number of combinations increase. By using the outputs of the recommendations in combination instead, the computation time can be reduced by computing each of the original algorithms once and storing the result.

Advantageously, the embodiments described herein allow for the identification of combinations of an experiment system's recommendation algorithms that will optimize a user defined metric. A combination of recommendation algorithms may refer to a set of weights, each weight in the set assigned to the output of a particular recommendation algorithm of the experiment system. The embodiments may include receiving a training metric, the training metric indicating a parameter to be optimized by content recommendations. A machine learning algorithm may be used to determine a plurality of different combinations of the recommendation algorithms in the system, and each of one or more of the plurality of combinations may be used to generate a content recommendation for one or more visitors. The statistical performance of each of the one or more combinations in optimizing the parameter (based on the content recommendations generated by those combinations) may be monitored and a higher percentage of visitors may be allocated to the combination that generates content recommendations that are the most effective at optimizing the parameter. Further, the embodiments may include a scaling function that is used while combining the recommendation algorithms. Each recommendation algorithm may be on a different scale (e.g. one might have output scores between 0 and 1 another might be 0 to infinity). In some embodiments, a combination of the recommendation algorithms may consist of a set of a global set of weights and a scaling function associated with recommendation algorithm such that their different values are comparable.

FIG. 1 is a block diagram of a content experiment system environment 100, according to some embodiments. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. Although the environment 100 shown in FIG. 1 includes two client devices 102, the environment 100 can include any number of client devices (e.g., thousands of client devices 102).

FIG. 1 and the other figures may use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, Long Term Evolution (LTE), 5G, digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a cellular data network, a metropolitan area network (MAN), and a wide area network (WAN). In another embodiment, the entities use custom and/or dedicated data communications technologies instead of, or in addition to, the ones described above.

Client devices 102 may communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the third-party content provider 107.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 include web pages. However, the content provider 107 may provide other types of content items (e.g., digital content) such as software applications, including web applications, mobile device applications, etc.). The web pages and software applications may include video, audio, a combination of video and audio, still images (e.g., JPEG), text documents, advertisements, and/or any other types of content. For purposes of convenience and the description of one embodiment, the content items provided by the content provider 107 will be referred to as web pages, but no limitation on the type of content items are intended by this terminology.

In one embodiment, the content provider 107 operates in conjunction with the experiment system 105 to perform content experimentation on web pages. The content provider 107 may display different variations of a web page, including different content recommendations, to client devices 102 based on instructions from the experiment system 105 that is conducting content experimentation on the web page for the content provider 107. A content experiment for a web page may test variations to the web page to determine how the variations alter user interaction, or some other metric, with the web page or whether the changes produce a desired result. An example of a desired result resulting from a change to a web page (e.g., different or new product recommendations) is an increase in purchases of products from a web page (in a retail web site example). Thus, content experimentation may validate new features of a web page or changes to elements on the web page before the new features or changes are put into production by the content provider 107.

One type of content experiment is a recommendation engine. A recommendation engine may be used to show visitors content or products they may be interested in, based on their browsing behaviors or the browsing behaviors of others, for example. In one example, on a web page of a retail website, a recommendation engine may display products that are related or complimentary to products that a visitor is currently viewing or has previously viewed or purchased. As discussed in further detail herein, a recommendation engine may operate using one or more recommendation algorithms, and each recommendation algorithm may function to generate recommendations based on, for example, the browsing behavior of the visitor (e.g., products viewed or purchased), the browsing behavior of other visitors, and semantic details of a product currently being viewed.

Figure 2B:
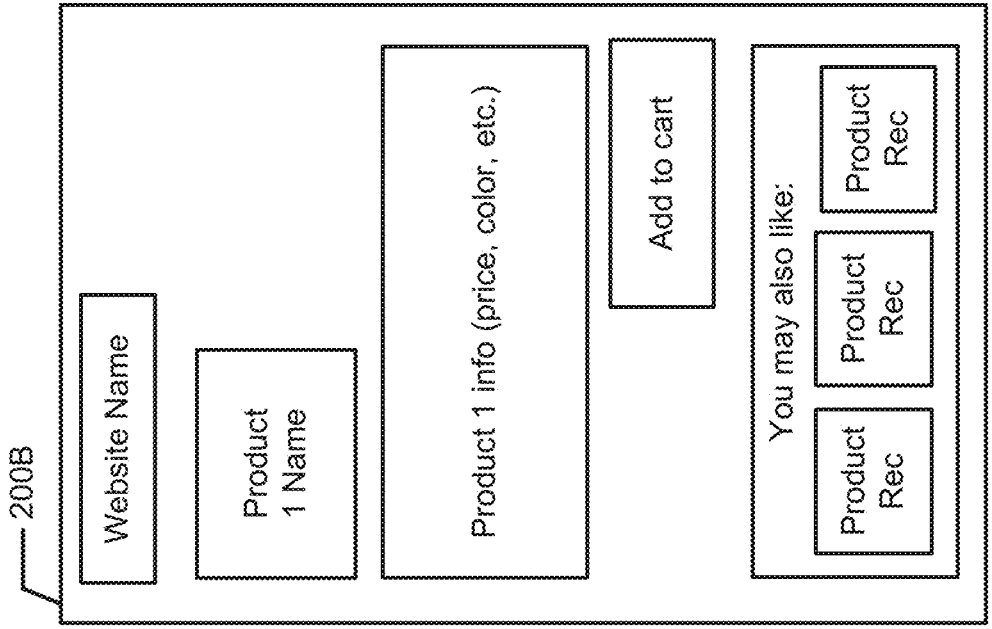
FIGS. 2A and 2B illustrate example web pages of a retail website, in accordance with some embodiments of the present disclosure.
Figure 2A:
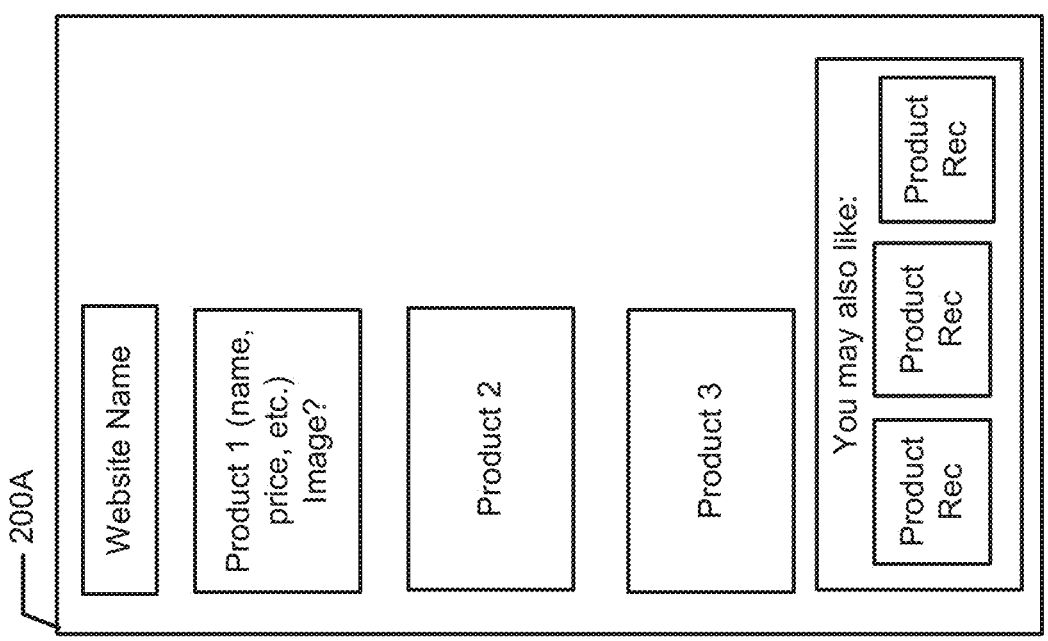

FIG. 2A is an example of a web page 200A (stated differently, a user interface thereof) that represents an implementation of a product search results web page provided by content provider 107. A visitor to the web site may reach the web page 200A by using a keyword search from a home page, for example. For purposes of convenience and the description of this embodiment, content provider 107 may be a retail website and the content provided by the content provider 107 may include web pages with product listings for a number of products. The web page 200A includes a website name of the website associated with the web page, product listings 1-3, and a product recommendations section (illustrated in FIG. 2A with the text "you may also like") which may display recommended products to a visitor based on for example, text information from the keyword search, the visitors browsing and/or purchase history, other visitors' browsing and/or purchase history, and/or semantic (e.g., text) information of a product the visitor is currently viewing. Each product listing 1-3 may include a picture (e.g., JPEG image of the product) as well as textual content (e.g., a name of the product, a price, etc.).

FIG. 2B is an example of a web page 200B (or, a user interface thereof), which may be the product page for product 1 that is reached upon the listing for product 1 (which may be a hyperlink) being clicked on by a visitor. The web page 200B includes the name of the website associated with the web page, the name of the product 1, and product information about product 1 including the price, color, etc. The web page 200B also includes an add to cart button, which may be used to purchase the product. The web page 200B further includes a product recommendations section, which may display recommended products to a visitor based on for example, the visitors browsing and/or purchase history, text/semantic information for the product (price, color, etc.) and/or other visitors' browsing and/or purchase history. The recommendations in the product recommendations section may be determined by a recommendation engine (not shown in FIG. 2B) using one or more recommendation algorithms as specified in the experiment record for the recommendation engine, as discussed in further detail herein. For example, the recommendation engine may analyze the text involved with product 1 (name, price, color, type etc.) and generate product recommendations based on products that have similar textual information. In another example, the recommendation engine may generate product recommendations based on products that have been trending (e.g., products that are being most frequently purchased) during a recent time period.

Referring back to FIG. 1, in one embodiment the content provider 107 includes a web server 111, web page 119, and web page content 123. The experiment system 105 includes experiment logic 113, visitor monitoring logic 114, identification (ID) assignment logic 115, an ID and event database 116, and an experiment database 117. As is known in the art, the term "logic" refers to computer program logic utilized to provide the specified functionality. Thus, logic can be implemented in hardware, firmware, and/or software. In one embodiment, program logic is stored on a non-transitory storage device (i.e., a computer program product), loaded into a memory, and executed by one or more computer processors. Additionally, those of skill in the art will recognize that other embodiments of the content provider 107 shown in FIG. 1 can have different and/or other logic than that described here, and that the functionalities can be distributed among the logic in a different manner.

Visitor monitoring logic 114 may track events such as clicks, page views, form submissions, when an item is added to a shopping cart, and purchases made by a visitor, for example. The events associated with a visitor may be referred to as the visitor's browsing behavior. Visitor monitoring logic 119 may also track search criteria that is input to a search engine of the web site by the visitor. Visitor monitoring logic 119 may store tracked events of a visitor in the ID and event database 116 in association with the visitor's user ID.

As discussed in further detail herein, experiment logic 113 may include a set of recommendation algorithms (shown in FIG. 3) and functionality to execute one or more recommendation algorithms to generate product recommendations. Each recommendation algorithm may function to generate product recommendations based on certain types of information, as discussed in further detail herein.

In one embodiment, the experiment database 117 stores multiple (i.e., a plurality) content experiment records that describe content experiments conducted by the experiment system 105. Each content experiment record may be associated with one or more web pages (e.g., whether a static web page or a web page), an experiment identifier unique to the content experiment, and a training metric to be optimized by determining a combination of recommendation algorithms that will generate product recommendations that optimize the training metric, as discussed in further detail herein.

An experiment record may also include user-defined URL targeting criteria that indicates where (e.g., which pages of a web site) and when to deliver the associated content experiments on the user's web site. The URL targeting criteria may be tied to specific URLs, multiple URLs or patterns of URLs on a web site, or they may be applied globally across an entire web site.

An experiment record may also include audience targeting rules, which describe criteria that visitors must meet to be part of the audience for that experiment. Only visitors that fall within the target audience may be eligible for that experiment. For example, a user may want an experiment to target visitors who've seen a specific AdWords campaign. In another example, a user may wish to show an experiment to visitors on mobile devices only. The user may then define audience targeting rules to provide the experiment to that particular group of visitors. Audiences may be defined based on a number of factors, including the type of browsers and/or type of devices being used by a visitor to access the website, a source the visitor arrived from (e.g., an AdWords campaign, a Google search, or a Facebook ad), visitors who have certain cookies, visitors who come to a user's page with certain query parameters (e.g., a parameter indicating that the visitor is a member of that website or is a VIP member of that website), a visitor ID and visitors with browsers set to certain geographical areas and/or languages among others. Thus, each content experiment may have audience targeting rules included in its experiment record that indicate which visitors are eligible for that experiment.

An experiment record may also include user defined membership threshold criteria for the experiment. Membership threshold criteria may be the percentage of eligible traffic (visitors) that is allowed to see an experiment. For example, if a user allocates 75% of their visitors who meet the audience targeting rules to an experiment, 25% of eligible visitors may not see the experiment at all. In some embodiments, experiment records may be augmented with information from external data sources to further define audience targeting rules, URL targeting criteria, or membership threshold criteria. For example, the experiment testing system 105 may retrieve information from other content providers, external databases, or other appropriate sources and store that information in an experiment record.

In some embodiments, the web server 111 links the content provider 107 to one or more client devices 102 and the experiment system 105 via the network 109. The web server 111 serves content items such as web pages, as well as other web related content, such as Java, Flash, XML, and so forth. The web server 111 may include a mail server or other messaging functionality for receiving and routing messages between the experiment system 105 and one or more client devices 102.

In one embodiment, the identification (ID) assignment logic 115 generates user IDs for users of client devices 102 (e.g., visitors). In one embodiment, the user ID is used by the user of a client device 102 to log into a web page or application provided by the content provider 107. In one embodiment, a user identifier is a string of numbers that is unique to a particular client device 102. Thus, client device 102A may have a different user identifier than the user identifier for client device 102B. In one embodiment, the ID assignment logic 115 generates a user identifier by automatically incrementing the value of the last user identifier generated by the ID assignment logic 115 using an auto increment function. Alternatively, the ID assignment logic 115 generates a unique random number and assigns the unique random number as a user identifier for a client device 102. In another embodiment, the ID assignment logic 115 may receive a user identifier from a client device 102. The user identifier received from the client device 102 may be generated by the client device 102 or by the client loaded on the web page of the client device, or the user identifier may be input by the user into the client device 102. The ID assignment logic 115 may store user identifiers in the ID and event database 116 that maintains a record of all assigned user identifiers.

In one embodiment, responsive to the content provider 107 receiving a request for a web page from a client device, the ID assignment logic 115 communicates with the client device 102 to determine whether the client device 102 already has a user identifier. For example, the ID assignment logic 115 may query the client device 102 to transmit the user identifier via a login form displayed on the web page. In another example, the ID assignment logic 115 queries the client device 102 to determine whether the client device 102 includes a stored cookie that comprises a user identifier for the client device 102. The ID assignment logic 115 may use the user ID to retrieve information about the visitor such as the visitor's browsing behavior. As discussed in further detail herein, experiment logic 113 may use this information to generate product recommendations for the visitor.

Figure 3:
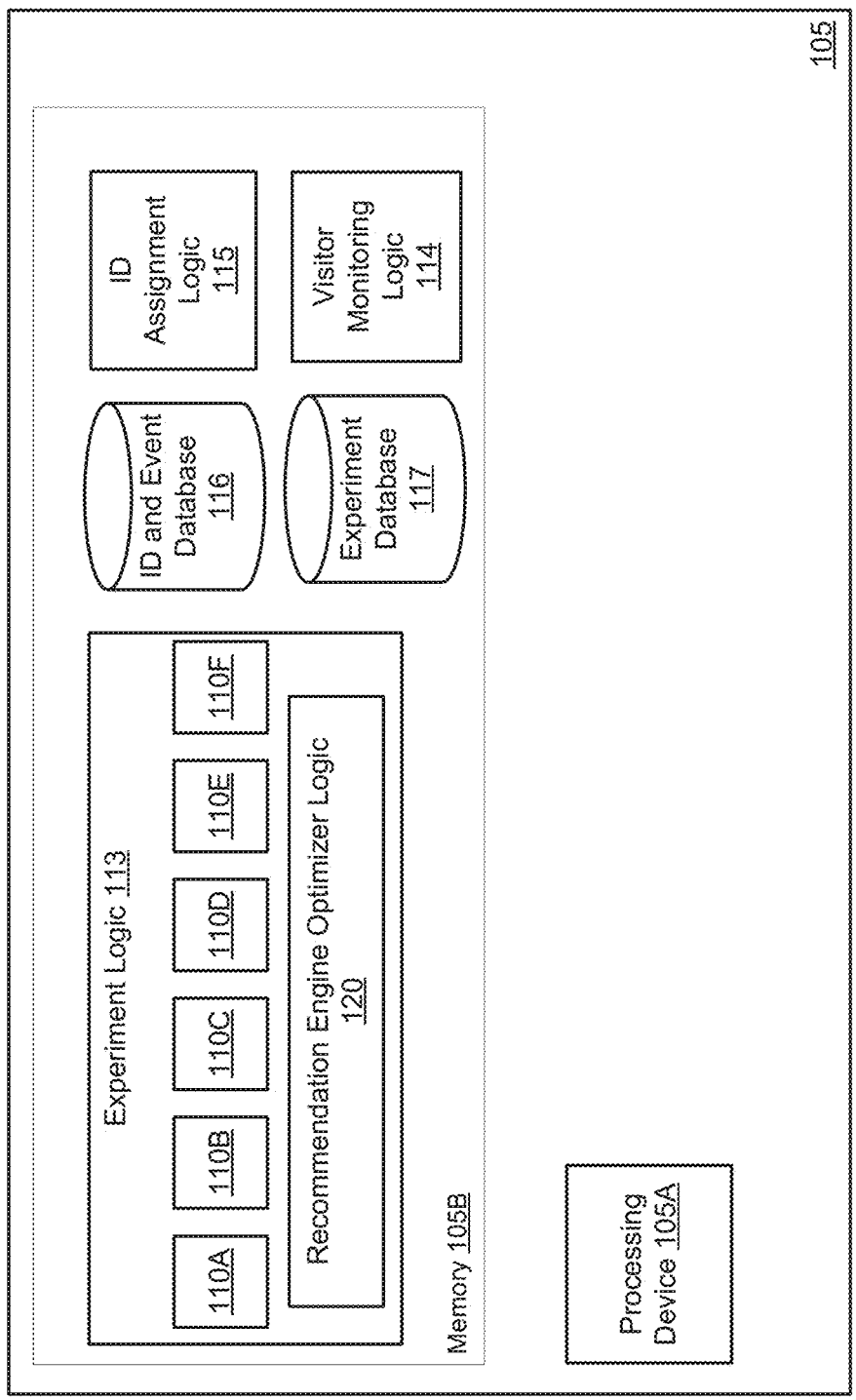
FIG. 3 is a block diagram of a content experiment system, in accordance with some embodiments of the present disclosure.

FIG. 3 illustrates the experiment system 105, of FIG. 1. As discussed above, the experiment system 105 may include hardware such as processing device 105A (e.g., processors, central processing units (CPUs), memory 105B (e.g., random access memory (RAM), storage devices (e.g., hard-disk drive (HDD), solid-state drive (SSD), etc.), and other hardware devices (e.g., sound card, video card, etc.) (not shown in FIG. 3). The experiment system 105 may comprise any suitable type of computing device or machine that has a programmable processor including, for example, server computers, desktop computers, laptop computers, tablet computers, smartphones, set-top boxes, etc. In some examples, the experiment system 105 may comprise a single machine or may include multiple interconnected machines (e.g., multiple servers configured in a cluster). The experiment system 105 may be implemented by a common entity/organization or may be implemented by different entities/organizations. The experiment system 105 may execute or include an operating system (OS), that may manage the execution of other components (e.g., software, applications, etc.) and/or may manage access to the hardware (e.g., processors, memory, storage devices etc.) of the computing device.

Memory 105B may include experiment logic 113, visitor monitoring logic 114, identification (ID) assignment logic 115, an ID and event database 116, an experiment database 117. Experiment logic 113 may include a set of recommendation algorithms 110A-110F, recommendation engine optimizer logic 120, and functionality to execute one or more recommendation algorithms 110 to generate content recommendations. Each recommendation algorithm 110 may function to generate content recommendations for a visitor based on certain information when executed by experiment logic 113. For example, certain recommendation algorithms 110 may generate product recommendations based on the visitor's (and/or other visitors') browsing behavior as obtained by visitor monitoring logic 114. Experiment logic 113 may also execute different combinations of the recommendations algorithms 110 to generate content recommendations for a visitor.

For example, recommendation algorithm 110A may be a "co-browse" algorithm, that generates product recommendations for a visitor interested in a particular product based on products that were viewed by other visitors who also purchased the particular product. Recommendation algorithm 110B may comprise a "co-buy" algorithm that generates product recommendations for a visitor interested in a particular product based on products that were purchased by other visitors who also viewed the particular product. Recommendation algorithm 110B may be useful in situations where visitors are likely to purchase complementary products or add several items to an order, for example. Recommendation algorithm 110C may be a "popular items" algorithm that generates product recommendations for a visitor based on the products that website visitors most frequently view or purchase. This algorithm helps showcase "crowd favorites" and may be used to introduce best-selling items to new visitors, for example.

Recommendation algorithm 110D may be a "recently viewed" algorithm that generates product recommendations for a visitor based on items that the visitor previously browsed. This algorithm may be used to remind a visitor of products that they have previously shown an interest in. Recommendation algorithm 110E may be a "user-based" algorithm that generates product recommendations based on products purchased, viewed, or otherwise interacted with by a group of visitors with similar browsing behavior/patterns as the visitor. This algorithm may be based on user IDs (rather than product IDs, like co-browse). Because user-based recommendations are based on visitors, they may be shown on any page of the web site for a personalized experience. Recommendation algorithm 110F may be a "semantic" algorithm that generates product recommendations based on the text of a product currently being viewed (and/or the text of one or more previously viewed products) by the visitor. The text of a product may include descriptive product information such as size, color, and type as well as more detailed descriptions such as product history, composition etc.

Although illustrated as having recommendation algorithms 110A-110F, experiment logic 113 may include any appropriate number of recommendation algorithms. The number and type of recommendation algorithms used, the training metric, and a variety of other factors (discussed above) for the recommendation engine (content experiment) may be pre-configured by a user in the experiment record for the recommendation engine. For example, the user may set up a recommendation engine with access to only 5 recommendation algorithms (selected by the user), and select revenue as the training metric to be optimized.

The output of each recommendation algorithm 110 (also referred to as the initial recommendation of an algorithm 110) may include a set (e.g., one or more) of product IDs corresponding to a set of product recommendations and a strength indicator that indicates how related each recommended product is to a product the visitor is currently viewing, for example.

In some embodiments, one or more of the algorithms 110 may be provided by a $3^{rd}$ party. More specifically, one or more algorithms 110 may be hosted on a separate $3^{rd}$ party system(s), which may provide the output of the algorithm(s) 110 to the experiment system 105. In this way, experiment system 105 may utilize $3^{rd}$ party algorithms without those $3^{rd}$ parties having to share information about their proprietary algorithm and/or other confidential data (e.g., sales data).

As can be seen, each algorithm 110 may focus on a particular type(s) of information for generating product recommendations. However, focus on a single or limited number of types of information when generating product recommendations may not provide the best recommendations for optimizing the training metric. In order to generate more comprehensive product recommendations that are based on a wide variety of information and will better optimize a particular training metric, processing device 105A may execute recommendation engine optimizer logic 120 (hereinafter logic 120). Logic 120 may explore, on a continuous basis, different combinations of the algorithms 110 to determine a combination that generates product recommendations that are most effective in optimizing the training metric. As used herein, a combination of the algorithms 110 may refer to a set of weights, each weight in the set assigned to a particular recommendation algorithm 110.

Figure 4A:
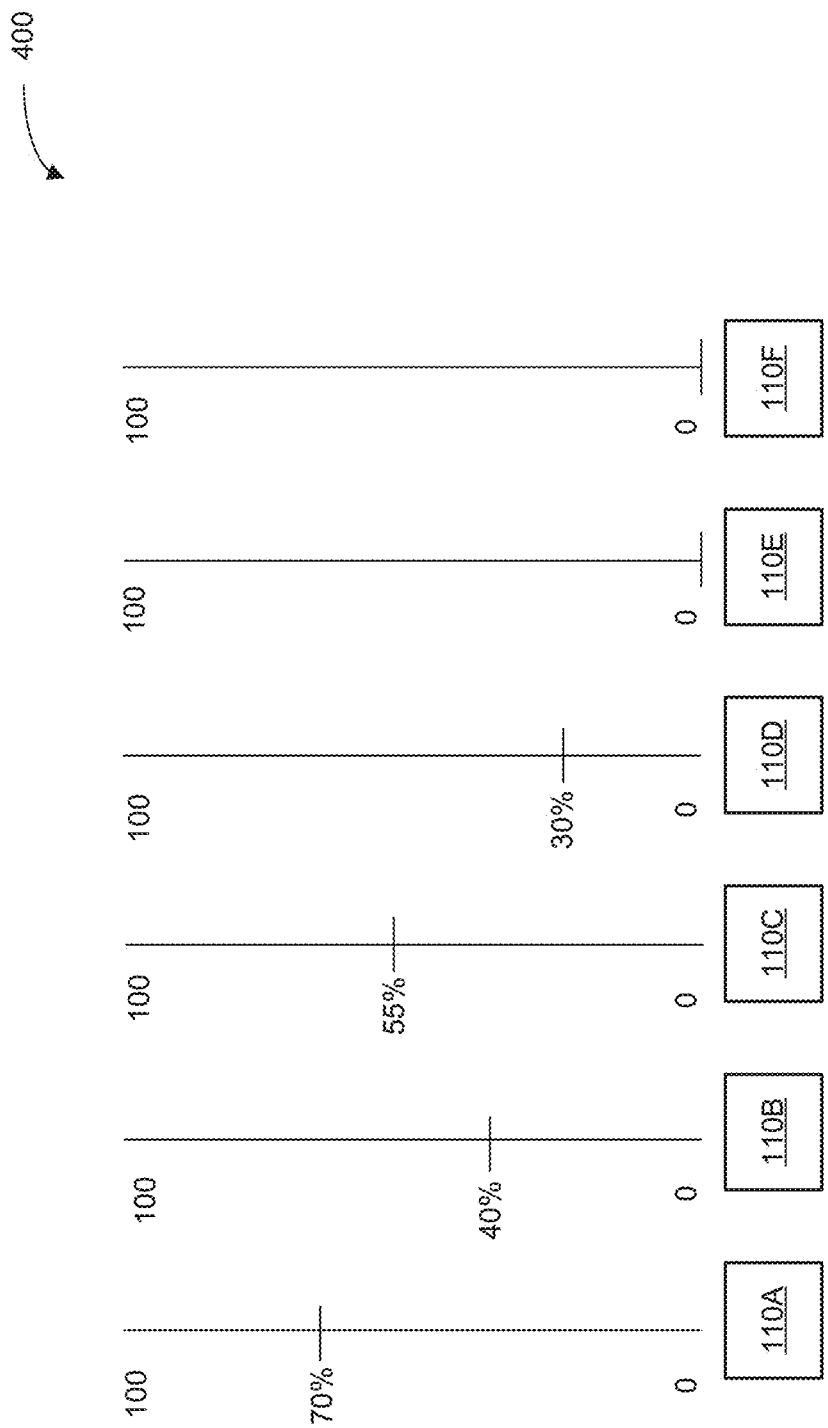
FIGS. 4A-C illustrate different combinations of recommendation algorithms, in accordance with some embodiments of the present disclosure.

For example, FIG. 4A illustrates a particular combination 400 of the recommendation algorithms 110, with a certain weight assigned to each algorithm 110. The output of each algorithm may be an ordered list or set of items with a strength score for each particular item. For example, the output of a particular algorithm may be ([item17, 0.94], [item103, 0.91], [item4, 0.90], . . . , [item78, 0.55], . . . , [item23, 0.22], . . . , [x, y]), where x is a particular item and y is the strength score. In the example of FIG. 4A, the outputs of the different algorithms may be combined where each algorithm has a weight scale from 0-100. It should be noted however, that any appropriate scale may be used. As can be seen, in combination 400, algorithm 110A has a weight of 70%, 110B has a weight of 40%, algorithm 110C has a weight of 55%, algorithm 110D has a weight of 30% and algorithms 110E and 110F have weights of 0 assigned. Different combinations may therefore include different weights for one or more of the algorithms 110.

Figure 4B:
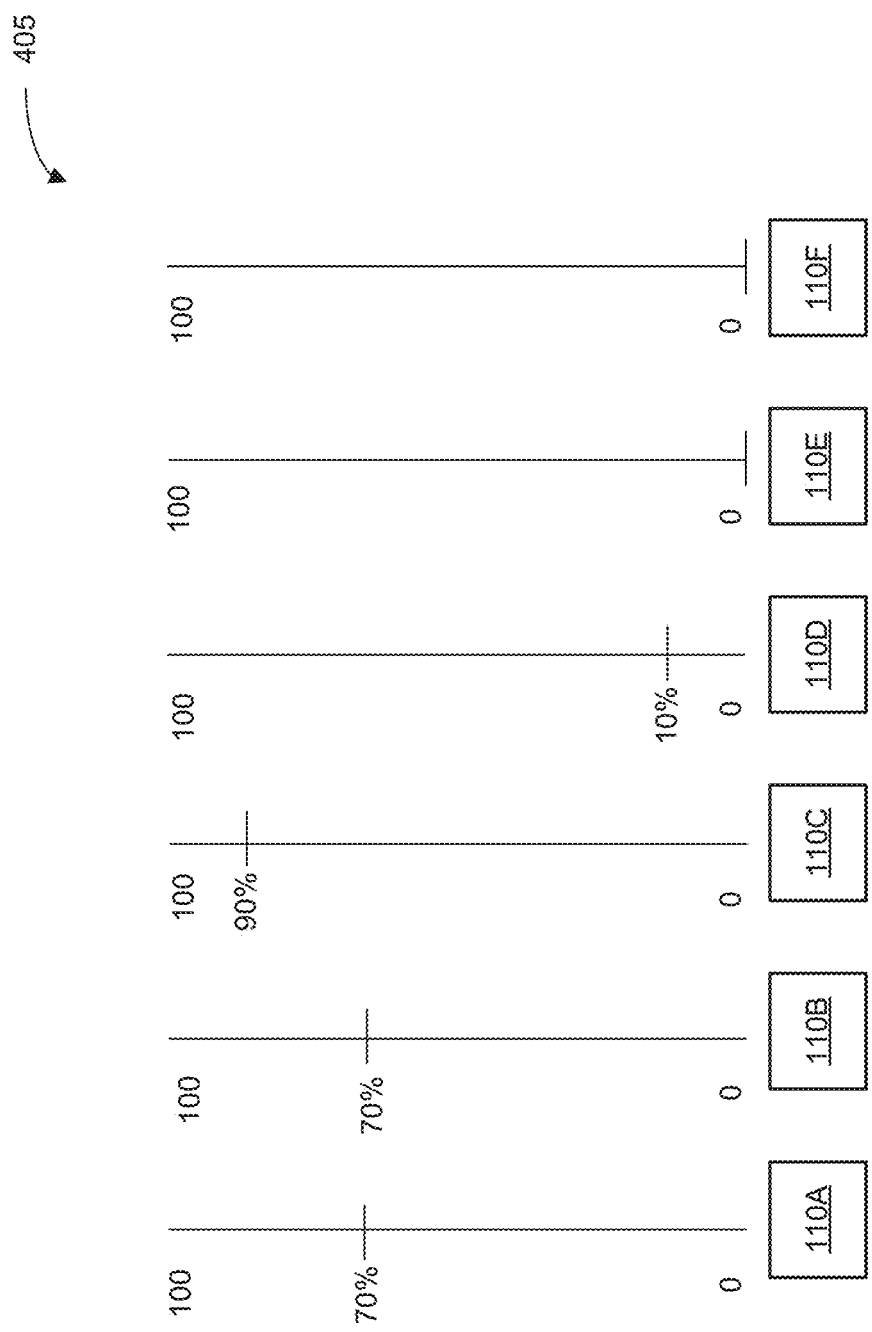

FIG. 4B illustrates another combination 405 of the algorithms 110. As can be seen, in combination 405, algorithm 110A has a weight of 70%, 110B has a weight of 70%, algorithm 110C has a weight of 90%, algorithm 110D has a weight of 10% and algorithms 110E and 110F have weights of 0 assigned. To generate a product recommendation using the combination 405, the output of each algorithm 110 may be multiplied by the algorithm's assigned weight and then the outputs may be added together. Thus, since algorithm 110B (the "co-buy" algorithm) is weighted at 70% and algorithm 110C (the "popular items" algorithm) is weighted at 90%, logic 120 may multiply the output of algorithm 110B (referred to as the initial recommendation of algorithm 110B) by 0.7 (70%) and the output of algorithm 110C (referred to as the initial recommendation of algorithm 110C) by 0.9 (90%). More specifically, logic 120 may multiply the strength indicator of each recommended product from the initial recommendation of algorithm 110B by 0.7 and the strength indicator of each recommended product from the initial recommendation of algorithm 110C by 0.9. In some embodiments, logic 120 may then add each weighted output together.

In some embodiments, the output of each algorithm 110 may have different scales. For example, the output of the algorithm 110B may have a strength indicator on a scale from 0-100, while the output of the algorithm 110C may have a strength indicator on a scale from 0-10. Thus, logic 120 may normalize the outputs of the algorithms 110 before combining them. In the example of FIG. 4B, logic 120 may multiply the strength indicators from the output of an algorithm 110 by that algorithm's assigned weighting factor and the product recommendation with the highest strength indicator may then be normalized to one. In addition, the remaining strength indicators may be scaled to a value between 0 and 1 accordingly based on their strength indicators (e.g., from highest remaining to lowest remaining). Logic 120 may perform this process for the output of each algorithm 110 and combine the normalized outputs of each algorithm 110 to create a ranking of the recommended products from all algorithms 110 based on each recommended product's strength indicator. In other embodiments, the strength indicator for an algorithm may not have an upper bound (e.g. scale 0 to infinity). In other embodiments, different algorithms may have different distributions. For example, a "most popular" algorithm may represent page views, which normally follow a power law or zipf distribution, while other algorithms may have a gaussian distribution. A scaling function may be applied to allow an algorithm's output to be directly comparable to another algorithm's output.

In some embodiments, logic 120 may only provide a certain number of the product recommendations to a visitor (e.g, the highest 7 product recommendations) The normalization method described as above is for example only, and any appropriate normalization algorithm may be used, such as the Softmax algorithm.

Logic 120 may explore different combinations of the algorithms in order to optimize the training metric. As discussed above, the experiment database 117 may include an experiment record with a user-defined training metric. The training metric may be pre-configured by a user when setting up the experiment, for example. The training metric may represent a parameter that the logic 120 seeks to optimize by generating product recommendations, as discussed in further detail herein. The training metric may be any measureable parameter, such as revenue, sales of certain items (e.g., less popular items), profit, and number of products purchased at one time, for example. In one example, a user may want to determine a combination of recommendation algorithms 110 that will generate product recommendations that result in optimization (e.g., maximum increase) of the sales of less popular items (the training metric). In some embodiments, a user may define a compound metric that will allow for optimization of more than one parameter simultaneously. The compound metric may be a single metric that includes criteria/information from two different parameters. Based on the training metric, logic 120 may begin exploring different combinations of algorithms 110. For each visitor, logic 120 may generate product recommendations using a particular combination of recommendation algorithms 110.

Logic 120 may utilize any appropriate active learning algorithm(s) to determine a plurality of different combinations of recommendation algorithms 110 for optimizing the training metric. Utilizing an active learning algorithm, logic 120 may simultaneously attempt to acquire samples (e.g., product recommendations) for new combinations by generating product recommendations for new visitors using new combinations (referred to as "exploration") and dynamically re-allocate new visitors to whichever combination is currently performing the best (e.g., whichever combination has generated product recommendations that have increased revenue the most) based on samples (referred to as "exploitation") of existing combinations. Logic 120 may balance experimentation and exploitation on a continuous basis in order to maximize revenue over a continuous period of time.

Initially, logic 120 may generate a new combination for each new visitor, until a baseline number of combinations for each of a number of combination spaces have each been utilized at least once. A combination space may be defined as a group of combinations having similar weighting schemes, such that the performance of a combination in the space is likely to be similar to other combinations in the space. Because the different combinations of recommendation algorithms may result in an almost infinite number of possible combinations, it may be difficult to obtain enough samples (e.g., product recommendations) for each possible combination to determine which combination is performing the best with reasonable certainty. Thus, logic 120 may attempt to generate (and acquire samples for) a baseline number of combinations for each combination space, instead of each possible combination. When selecting a new combination from a new combination space, logic 120 may use a correlated beliefs model to identify spaces (groups of combinations with similar weights) where additional data is needed and select each new combination from such spaces. To do this, logic 120 may put limits on the weights to be selected for new combinations based on how close they are (e.g., how similar their weighting scheme is) to combinations that have already been explored and exclude combinations that are within a threshold similarity to combinations that have already been explored. Thus, the baseline number of combinations selected from each space may be representative of the entire space. The baseline number of combinations for each combination space may refer to the number of combinations that will enable logic 120 to infer the performance of combinations in that particular combination space. Although described as obtaining at least one sample for each of a baseline number of combinations, logic 120 may obtain any appropriate number of samples for each of the baseline number of combinations before balancing exploration with exploitation.

Upon generating (and acquiring samples for) the baseline number of combinations for each combination space, for each new visitor, logic 120 may determine whether the visitor should be shown product recommendations generated by a combination that is currently performing the best, or if they should be shown product recommendations generated by a newly determined combination (e.g., to explore a space where there are not enough samples or to further explore a space where there are a number of high performing combinations) in the same manner as described above. In this way, logic 120 may continue to optimize the training metric across a number of combinations/spaces.

For example, if a 1000 visitors have been provided recommendations by a particular combination (e.g., the combination illustrated in FIG. 4A), logic 120 may predict that combinations that are similar to the combination of FIG. 4A (e.g., in the same combination space as the combination illustrated in FIG. 4A) will have similar performance. Thus, when attempting to acquire samples of new combinations, logic 120 may attempt to select combinations that are sufficiently different from combinations for which there are currently samples (i.e. select combinations from unexplored spaces). To do this, logic 120 may put limits on the weights to be selected for new combinations based on how close they are (e.g., how similar their weighting scheme is) to combinations that have already been explored and exclude combinations that are within a threshold similarity to combinations that have already been explored.

In some embodiments, logic 120 may purposely select new combinations that are in close proximity to combinations that are currently performing well. For example, logic 120 may determine that combinations that are closely related to combinations that are performing well are likely to yield better results, and thus may select new combinations that are in the same space as a combination that is currently performing the best.

Logic 120 may monitor the performance of each combination in generating product recommendations that optimize the training metric. More specifically, logic 120 may monitor the impact of a particular combination on optimizing the training metric based on how the product recommendations generated by that combination affect the training metric. For example, if the training metric is total revenue, logic 120 may monitor total revenue from purchases by visitors who have been shown product recommendations generated by a particular combination, and attribute any increase or decrease in revenue to that particular combination. As discussed above, logic 120 may exploit the training metric (e.g., drive revenue) by dynamically reallocating a portion of the traffic to whichever combination of recommendation algorithms is generating recommendations that result in the most improvement of the training metric (i.e. optimize the training metric). Stated differently, a portion of new users may be shown content recommendations generated by the combination of recommendation algorithms that results in the most improvement of the training metric. The content recommendations may be integrated into a user interface (see e.g., FIG. 2) through which each of the portion of new users interact with the content provider. In this way, a content provider may extract as much value as possible from the leading combination during the experiment lifecycle, and thereby avoid the opportunity cost of showing suboptimal product recommendations. In this way, the embodiments described herein enhance content recommendation and user interface technologies.

As discussed above, logic 120 may balance experimentation and exploitation on a continuous basis in order to maximize revenue over a continuous period of time. As such, logic 120 may also monitor the effect of time variation on each combination's performance in generating product recommendations that optimize the training metric. Time variation may be defined as a dependence of the underlying distribution of the training metric value on time. Stated differently, time variation occurs when the training metric's conversion rate for one or more combinations changes over time. Time variation may be caused by a change in the underlying conditions that affect visitor behavior. For example, visitors may purchase more products on weekends than on weekdays, a new discount may result in an increase in purchases by visitors, or a marketing campaign in a new market may bring in a large number of visitors with different interaction/browsing behavior than existing visitors. This may result in combinations performing differently than they did previously. For example, a particular marketing campaign may result in a combination that generated product recommendations that previously optimized revenue the most to experience a decline in revenue, while other combinations that were previously less effective may begin to experience an increase in the revenue generated by their product recommendations and thus logic 120 may begin dynamically reallocating new visitors to these combinations.

Figure 4C:
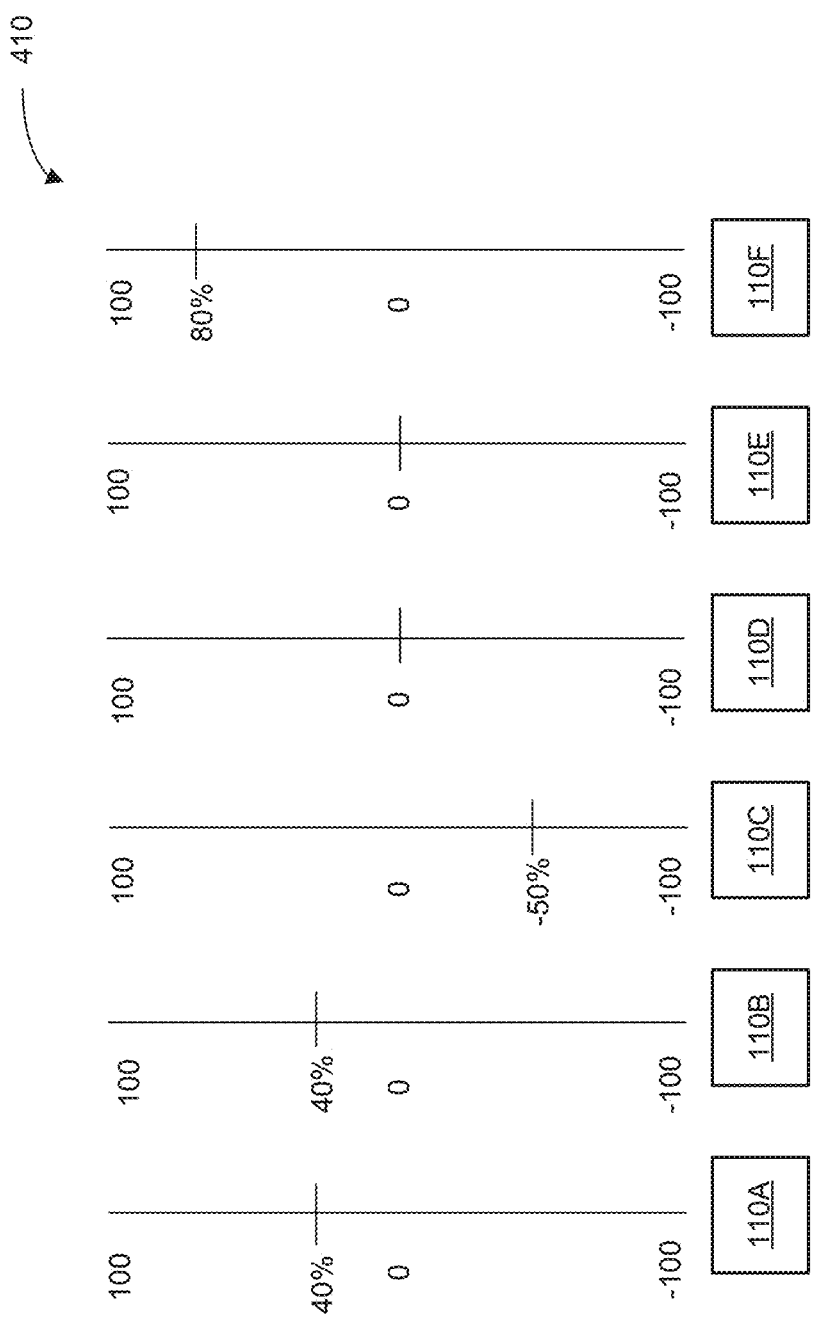

In some embodiments, certain combinations may include negative weights for one or more of the algorithms 110. FIG. 4C illustrates an example of a combination 410 where one or more algorithms 110 have a negative weighting factor applied. As can be seen in FIG. 4C, algorithm 110A has a weight of 40%, 110B has a weight of 40%, algorithm 110C (the popular items algorithm) has a weight of −50%, algorithm 110D has a weight of 0%, algorithm 110E has a weight of 0%, and algorithm 110F has a weight of 80%.

Logic 120 may utilize combinations involving negative weights in a number of situations. For example, if the training metric supplied indicates unpopular items as the metric to optimize, logic 120 may determine combinations where the popular items algorithm (110C) is given a negative weighting factor and the semantic algorithm (110F) is given a positive weighting factor (as in FIG. 4C), so that products that are conceptually related to a product currently being viewed but are not among the most popular may be recommended. In other aspects, a negative weight may be used to indicate whether a product is in stock or to implement logical rules regarding whether to include an item (e.g. exclude item if the price of the item is above X amount).

Figure 5:
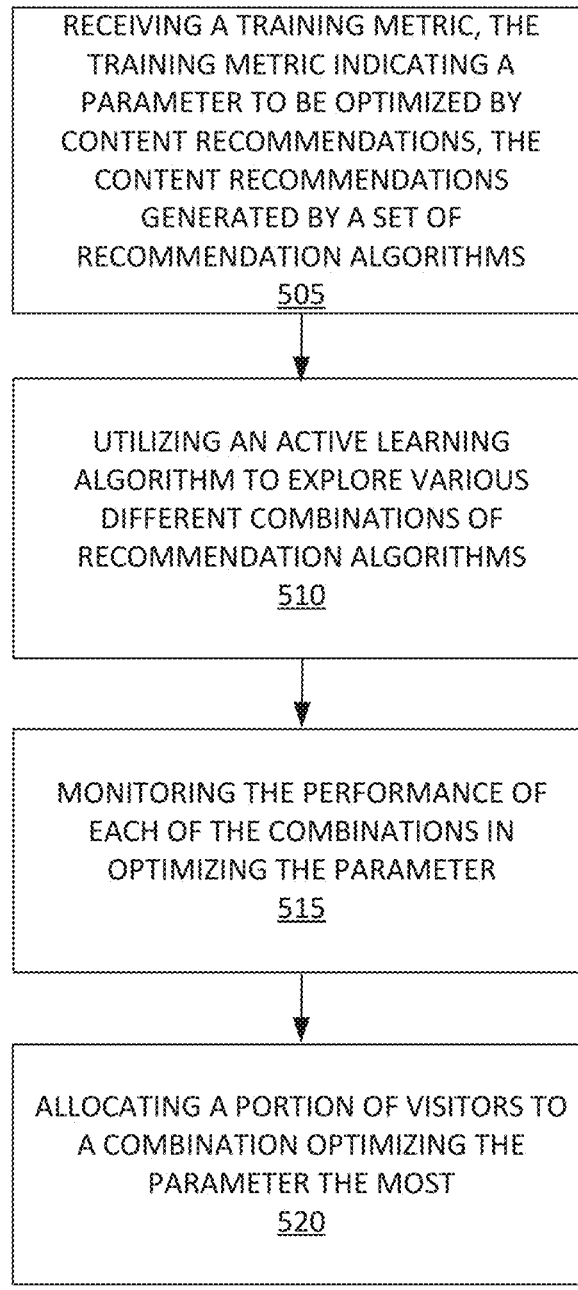
FIG. 5 is a flow diagram of a method of generating content recommendations that are designed to optimize a training metric, in accordance with some embodiments of the present disclosure.

FIG. 5 is a first flow diagram of a method 500 of generating product recommendations that will optimize a training metric by exploring different combinations of recommendation algorithms, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by experiment system 105 of FIGS. 1 and 3.

The method 500 begins at block 505, where experiment system 105 may receive a training metric, the training metric indicating a parameter to be optimized by content recommendations. As discussed above, the experiment database 117 may include an experiment record with a user-defined training metric. The training metric may be pre-configured by a user when setting up the experiment, for example. The training metric may represent a parameter that the logic 120 is optimizing against. The training metric may be any measureable parameter, such as revenue, sales of certain items (e.g., less popular items), profit, and number of products purchased at one time, for example. In one example, a user may want to determine a combination of recommendation algorithms 110 that will generate product recommendations that result in optimization (e.g., maximum increase) of the sales of less popular items (the training metric). In some embodiments, a user may define a compound metric that will allow for optimization of more than one parameter simultaneously. The compound metric may be a single metric that includes criteria/information from two different parameters. Based on the training metric, logic 120 may begin exploring different combinations of algorithms 110A-110F. For each visitor, logic 120 may generate product recommendations using a particular combination of recommendation algorithms 110.

At block 510, Logic 120 may utilize any appropriate active learning algorithm(s) to determine a plurality of various different combinations of recommendation algorithms 110 for optimizing the training metric. Utilizing an active learning algorithm, logic 120 may simultaneously attempt to acquire samples for new combinations by generating product recommendations using new combinations on new visitors (referred to as "exploration") and dynamically re-allocate new visitors to whichever combination is currently performing the best (e.g., whichever combination has generated product recommendations that have increased revenue the most) based on samples (referred to as "exploitation") of each existing combination. Logic 120 may balance experimentation and exploitation on a continuous basis in order to maximize revenue over a continuous period of time.

At block 515, logic 120 may monitor the performance of each combination in generating product recommendations that optimize the training metric. More specifically, logic 120 may monitor the impact of a particular combination on optimizing the training metric based on how the product recommendations generated by that combination affect the training metric. For example, if the training metric is total revenue, logic 120 may monitor total revenue from purchases by visitors who have been shown product recommendations generated by a particular combination, and attribute any increase or decrease in revenue to that particular combination. At block 520, logic 120 may exploit the training metric (e.g., drive revenue) by dynamically reallocating a portion of the traffic to whichever combination of recommendation algorithms is generating recommendations that result in the most improvement of the training metric (i.e. optimize the training metric). In this way, a content provider may extract as much value as possible from the leading combination during the experiment lifecycle, and thereby avoid the opportunity cost of showing sub-optimal product recommendations.

Figure 6:
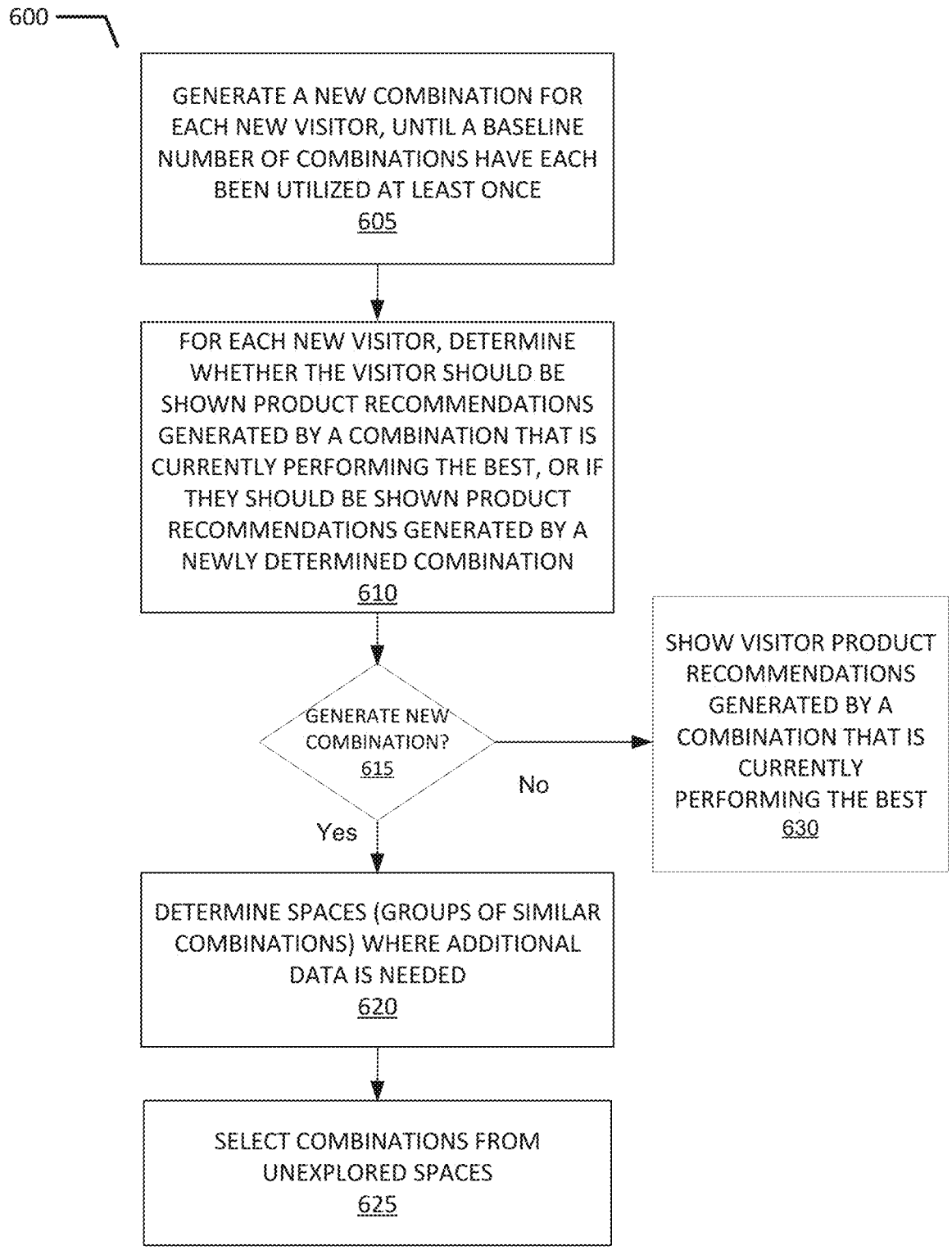
FIG. 6 is a flow diagram of a method of selecting new combinations of recommendation algorithms that are designed to optimize a training metric, in accordance with some embodiments of the present disclosure.

FIG. 6 is a second flow diagram of a method 600 of selecting new combinations of recommendation algorithms, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by experiment system 105 of FIGS. 1 and 3.

The method 600 begins at block 605, where experiment system 105 may generate a new combination for each new visitor, until a baseline number of combinations for each of a number of combination spaces have each been utilized at least once. A combination space may be defined as a group of combinations having similar weighting schemes, such that the performance of a combination in the space is likely to be similar to other combinations in the space. Because the different combinations of recommendation algorithms may result in an almost infinite number of possible combinations, it may be difficult to obtain enough samples (e.g., product recommendations) for each possible combination to determine which combination is performing the best with reasonable certainty. Thus, experiment system 105 may attempt to generate (and acquire samples for) a baseline number of combinations for each combination space, instead of each possible combination. When selecting each new combination, experiment system 105 may use a correlated beliefs model to identify spaces (groups of combinations with similar weights) where additional data is needed and select each new combination from such spaces. Thus, the baseline number of combinations selected from each space may be representative of the entire space. The baseline number of combinations for each combination space may refer to the number of combinations that will enable experiment system 105 to infer the performance of combinations in that particular combination space. Although described as obtaining at least one sample for each of a baseline number of combinations, experiment system 105 may obtain any appropriate number of samples for each of the baseline number of combinations before balancing exploration with exploitation.

Upon generating (and acquiring samples for) the baseline number of combinations for each combination space, at block 610, for each new visitor, experiment system 105 may determine whether the visitor should be shown product recommendations generated by a combination that is currently performing the best, or if they should be shown product recommendations generated by a newly determined combination (e.g., to explore a space where there are not enough samples or to further explore a space where there are a number of high performing combinations) in the same manner as described above. In this way, experiment system 105 may continue to optimize the training metric across a number of combinations/spaces.

At block 615, in response to determining that the new visitor should be shown product recommendations generated by a newly determined combination, method 600 may proceed to block 620 where logic 120 may use a correlated beliefs model to determine a new combination to generate product recommendations with (acquiring a sample for a new combination) as discussed above. For example, if a 1000 visitors have been provided recommendations by a particular combination (e.g., the combination illustrated in FIG. 4A), logic 120 may predict that combinations that are similar to the combination of FIG. 4A (e.g., in the same combination space as the combination illustrated in FIG. 4A) will have similar performance. Thus, when attempting to acquire samples of new combinations, logic 120 may attempt to select combinations that are sufficiently different from combinations for which there are currently samples (i.e. select combinations from unexplored spaces). To do this, logic 120 may put limits on the weights to be selected for new combinations based on how close they are (e.g., how similar their weighting scheme is) to combinations that have already been explored and exclude combinations that are within a threshold similarity to combinations that have already been explored.

If at block 615, it is determined that the new visitor should be shown product recommendations generated by a combination that is currently performing the best, then logic 120 may dynamically re-allocate the new visitor to whichever combination is currently performing the best (e.g., whichever combination has generated product recommendations that have increased revenue the most) based on the current data samples at block 630.

As discussed above, logic 120 may balance experimentation and exploitation on a continuous basis in order to maximize revenue over a continuous period of time. As such, logic 120 may also monitor the effect of time variation on each combination's performance in generating product recommendations that optimize the training metric. Time variation may be defined as a dependence of the underlying distribution of the training metric value on time. Stated differently, time variation occurs when the training metric's conversion rate for one or more combinations changes over time. Time variation may be caused by a change in the underlying conditions that affect visitor behavior. For example, visitors may purchase more products on weekends than on weekdays, a new discount may result in an increase in purchases by visitors, or a marketing campaign in a new market may bring in a large number of visitors with different interaction/browsing behavior than existing visitors. This may result in combinations performing differently than they did previously. For example, a particular marketing campaign may result in a combination that generated product recommendations that previously optimized revenue the most to experience a decline in revenue, while other combinations that were previously less effective may begin to experience an increase in the revenue generated by their product recommendations and thus logic 120 may begin dynamically reallocating new visitors to these combinations.

Figure 7:
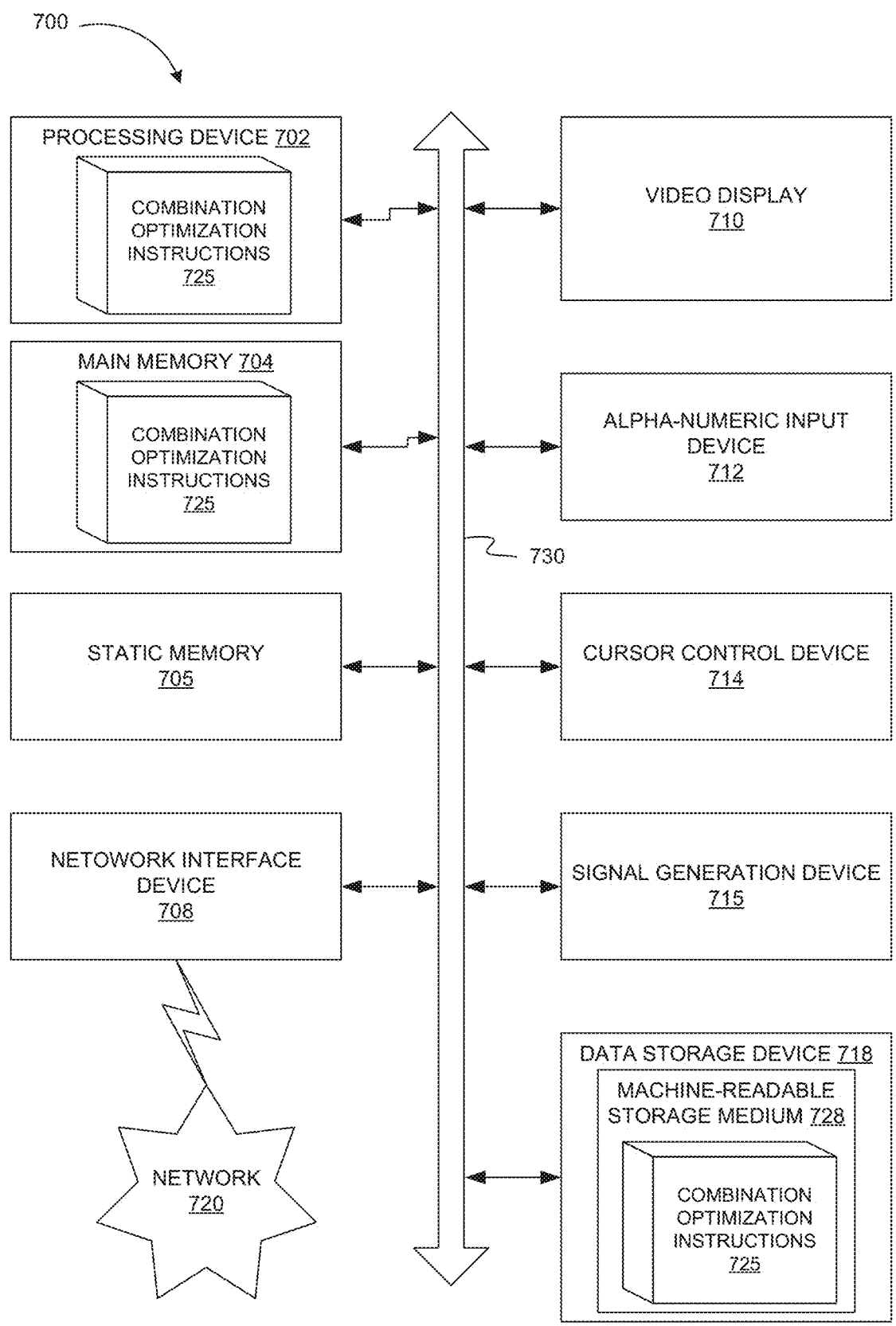
FIG. 7 is a block diagram of an example apparatus that may perform one or more of the operations described herein, in accordance with some embodiments of the present disclosure.

FIG. 7 is a block diagram of an example computing device 700 that may perform one or more of the operations described herein, in accordance with some embodiments. In various embodiments, computing device 700 may represent computing devices (e.g., servers) of the experimentation platform, third-party content provider client devices, and/or third-party content provider servers. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a machine-readable storage medium 728 on which may be stored one or more sets of instructions, e.g., combination optimization instructions 725 for carrying out the operations described herein, in accordance with one or more aspects of the present disclosure. Combination optimization instructions 725 may also reside, completely or at least partially, within main memory 704 and/or within processing device 702 during execution thereof by computing device 700, main memory 704 and processing device 702 also constituting computer-readable media. The combination optimization instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, at a processing device of an experiment system, a parameter associated with a set of recommendation algorithms, the set of recommendation algorithms operating as an experiment for content hosted by a content provider;
    generating, by the processing device, a first combination of the recommendation algorithms having a first set of weights, the first combination comprising a first subset of the set of recommendation algorithms;
    assigning each of the first combination of the recommendation algorithms to a respective one of the first set of weights;

generating, by the processing device, a second combination of the recommendation algorithms having a second set of weights, the second combination comprising a second subset of the set of recommendation algorithms;
assigning each of the second combination of the recommendation algorithms to a respective one of the second set of weights, wherein at least one weight of the second set of weights is different from the first set of weights;
generating, by the processing device, first content recommendations for a first plurality of users using the first combination of the recommendation algorithms and the associated first set of weights;
generating second content recommendations for a second plurality of users, different from the first plurality of users, using the second combination of the recommendation algorithms and the associated second set of weights;
comparing, by the processing device, a first performance of the first content recommendations with respect to the parameter to a performance of the second content recommendations with respect to the parameter; and
allocating, by a processing device, a portion of new users to the first combination of the recommendation algorithms responsive to determining that the first content recommendations generated using the first combination of the recommendation algorithms result in a better performance with respect to the parameter than the second content recommendations generated using the second combination of the recommendation algorithms, wherein subsequent content recommendations generated by the first combination of the recommendation algorithms are integrated into a user interface through which the portion of new users interact with the content provider, and
wherein the respective algorithms of the first combination of the recommendation algorithms are the same as the respective algorithms of the second combination of the recommendation algorithms.

2. The method of claim 1, wherein generating the first content recommendations comprises:
generating an initial recommendation using each of the recommendation algorithms in the first combination of the recommendation algorithms;
multiplying each of the initial recommendations by the weight assigned to the recommendation algorithm that generated the initial recommendation;
normalizing the initial recommendations based on a strength score of each of the initial recommendations; and
combining the initial recommendations together to generate the first content recommendations.

3. The method of claim 1, wherein the first combination of the recommendation algorithms is generated using a machine learning algorithm.

4. The method of claim 1, further comprising:
in response to a new user, determining whether to generate content recommendations for the new user using the first combination of the recommendation algorithms or a new combination of the recommendation algorithms;
in response to determining that a new combination of the recommendation algorithms should be used, generating the new combination of the recommendation algorithms and assigning a weight to each algorithm in the new combination of the recommendation algorithms; and
generating a content recommendation for the new user using the new combination.

5. The method of claim 4, wherein generating the new combination of the recommendation algorithms and assigning the weight to each algorithm in the new combination of the recommendation algorithms comprises:
selecting the respective weight for each algorithm of the new combination of the recommendation algorithm based on a proximity of the respective weight to the first set of weights and the second set of weights.

6. The method of claim 1, further comprising:
for each of the first and second combinations of the recommendation algorithms, monitoring a time variation of the performance of the combination with respect to the parameter.

7. The method of claim 1, wherein one or more of the first combination of the recommendation algorithms is an algorithm hosted separately from the remaining recommendation algorithms of the first combination of the recommendation algorithms.

8. A system comprising:
a memory to store a set of recommendation algorithms; and
a processing device operatively coupled to the memory, the processing device to:
receive a parameter associated with the set of recommendation algorithms, the set of recommendation algorithms operating as an experiment for content hosted by a content provider;
generate a first combination of the recommendation algorithms having a first set of weights, the first combination comprising a first subset of the set of recommendation algorithms;
assign each of the first combination of the recommendation algorithms to a respective one of the first set of weights;
generate a second combination of the recommendation algorithms having a second set of weights, the second combination comprising a second subset of the set of recommendation algorithms;
assign each of the second combination of the recommendation algorithms to a respective one of the second set of weights, wherein at least one weight of the second set of weights is different from the first set of weights;
generate first content recommendations for a first plurality of users using the first combination of the recommendation algorithms and the associated first set of weights;
generate second content recommendations for a second plurality of users, different from the first plurality of users, using the second combination of the recommendation algorithms and the associated second set of weights;
compare a first performance of the first content recommendations with respect to the parameter to a performance of the second content recommendations with respect to the parameter; and
allocate a portion of new users to the first combination of the recommendation algorithms responsive to determining that the first content recommendations generated using the first combination of the recommendation algorithms result in a better performance with respect to the parameter than the second content recommendations generated using the second combination of the recommendation algorithms, wherein subsequent content recommendations generated by the first combination of the recommendation algorithms are integrated into a user interface through which the portion of new users interact with the content provider, wherein the respective algorithms of the first combination of the recommendation algorithms are the same as the respective algorithms of the second combination of the recommendation algorithms.

9. The system of claim 8, wherein to generate the first content recommendations, the processing device is to:
generate an initial recommendation using each of the recommendation algorithms in the first combination of the recommendation algorithms;
multiply each of the initial recommendations by the weight assigned to the recommendation algorithm that generated the initial recommendation;
normalize the set of initial recommendations based on a strength score of each of the initial recommendations; and
combine the initial recommendations together to generate the first content recommendations.

10. The system of claim 8, wherein the processing device uses a machine learning algorithm to generate the first combination of the recommendation algorithms.

11. The system of claim 8, wherein the processing device is further to:
in response to a new user, determine whether to generate content recommendations for the new user using the first combination of the recommendation algorithms or a new combination of the recommendation algorithms;
in response to determining that a new combination of the recommendation algorithms should be used, generate the new combination of the recommendation algorithms and assign a weight to each algorithm in the new combination of the recommendation algorithms; and
generate a content recommendation for the new user using the new combination.

12. The system of claim 11, wherein to generate the new combination of the recommendation algorithms and assign the weight to each algorithm in the new combination of the recommendation algorithm, the processing device is to:
select the respective weight for each algorithm of the new combination of the recommendation algorithm based on a proximity of the respective weight to the first set of weights and the second set of weights.

13. The system of claim 8, wherein the processing device is further to:
for each of the first and second combinations of the recommendation algorithms, monitor a time variation of the performance of the combination with respect to the parameter.

14. The system of claim 8, wherein one or more of the first combination of the recommendation algorithms is an algorithm hosted separately from the remaining recommendation algorithms of the first combination of the recommendation algorithms.

15. A non-transitory computer readable medium, having instructions stored thereon which, when executed by a processing device, cause the processing device to:
receive a parameter associated with a set of recommendation algorithms, the set of recommendation algorithms operating as an experiment for content hosted by a content provider;
generate, by the processing device, a first combination of the recommendation algorithms having a first set of weights, the first combination comprising a first subset of the set of recommendation algorithms;
assign each of the first combination of the recommendation algorithms to a respective one of the first set of weights;
generate, by the processing device, a second combination of the recommendation algorithms having a second set of weights, the second combination comprising a second subset of the set of recommendation algorithms;
assign each of the second combination of the recommendation algorithms to a respective one of the second set of weights, wherein at least one weight of the second set of weights is different from the first set of weights;
generate, by the processing device, first content recommendations for a first plurality of users using the first combination of the recommendation algorithms and the associated first set of weights;
generate second content recommendations for a second plurality of users, different from the first plurality of users, using the second combination of the recommendation algorithms and the associated second set of weights;
compare a first performance of the first content recommendations with respect to the parameter to a performance of the second content recommendations with respect to the parameter; and
allocate a portion of new users to the first combination of the recommendation algorithms responsive to determining that the first content recommendations generated using the first combination of the recommendation algorithms result in a better performance with respect to the parameter than the second content recommendations generated using the second combination of the recommendation algorithms, wherein subsequent content recommendations generated by the first combination of the recommendation algorithms are integrated into a user interface through which the portion of new users interact with the content provider, wherein the respective algorithms of the first combination of the recommendation algorithms are the same as the respective algorithms of the second combination of the recommendation algorithms.

16. The non-transitory computer readable medium of claim 15, wherein to generate the first content recommendations, the processing device is to:
generate an initial recommendation using each of the recommendation algorithms in the first combination of the recommendation algorithms;
multiply each of the initial recommendations by the weight assigned to the recommendation algorithm that generated the initial recommendation;
normalize the set of initial recommendations based on a strength score of each of the initial recommendations; and
combine the initial recommendations together to generate the first content recommendations.

17. The non-transitory computer readable medium of claim 15, wherein the processing device uses a machine learning algorithm to generate the first combination of the recommendation algorithms.

18. The non-transitory computer readable medium of claim 15, wherein the processing device is further to:
in response to a new user, determine whether to generate content recommendations for the new user using the first combination of the recommendation algorithms or a new combination of the recommendation algorithms;
in response to determining that a new combination of the recommendation algorithms should be used, generate the new combination of the recommendation algorithms and assign a weight to each algorithm in the new combination of the recommendation algorithms; and generate a content recommendation for the new user using the new combination.

19. The non-transitory computer readable medium of claim 18, wherein to generate the new combination of the recommendation algorithms and assign the weight to each algorithm in the new combination of the recommendation algorithm, the processing device is to:

select the respective weight for each algorithm of the new combination of the recommendation algorithm based on a proximity of the respective weight to the first set of weights and the second set of weights.

20. The non-transitory computer readable medium of claim 15, wherein the processing device is further to:

for each of the first and second combinations of the recommendation algorithms, monitor a time variation of the performance of the combination with respect to the parameter.

* * * * *